(12) United States Patent
Karidis et al.

(10) Patent No.: US 7,184,796 B2
(45) Date of Patent: Feb. 27, 2007

(54) PERSONAL COMMUNICATION DEVICE HAVING A BUILT IN PROJECTION DISPLAY

(75) Inventors: John Peter Karidis, Ossining, NY (US); Noboru Kamijo, Fujisawa (JP); Susan Sommers Moffatt, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 09/912,779

(22) Filed: Jul. 25, 2001

(65) Prior Publication Data

US 2002/0068614 A1 Jun. 6, 2002

Related U.S. Application Data

(60) Provisional application No. 60/251,202, filed on Dec. 4, 2000.

(51) Int. Cl.
*H04B 1/37* (2006.01)
*H04M 1/00* (2006.01)

(52) U.S. Cl. ............... 455/566; 455/575.3; 455/575.8; 455/158.4; 455/158.5; 345/205

(58) Field of Classification Search ............... 455/566, 455/550.1, 575.3, 575.8, 575.1, 90.3, 158.4, 455/158.5; 345/7, 168, 205
See application file for complete search history.

(56) References Cited

U.S. PATENT DOCUMENTS

| | | | |
|---|---|---|---|
| 5,436,954 A * | 7/1995 | Nishiyama et al. | 455/566 |
| 5,610,971 A | 3/1997 | Vandivier | 379/58 |
| 5,845,215 A | 12/1998 | Henry et al. | 455/553 |
| 5,867,795 A * | 2/1999 | Novis et al. | 455/566 |
| 5,970,418 A | 10/1999 | Budd et al. | 455/550 |
| 6,026,300 A | 2/2000 | Hicks | 455/434 |
| 6,061,576 A | 5/2000 | Terrasson | 455/566 |
| 6,097,964 A | 8/2000 | Nuovo et al. | 455/550 |
| 6,141,560 A | 10/2000 | Gillig et al. | 455/550 |
| 6,151,486 A * | 11/2000 | Holshouser et al. | 455/575.3 |
| 6,157,845 A | 12/2000 | Henry et al. | 455/553 |
| 6,161,026 A | 12/2000 | Uchida | 455/566 |
| 6,195,569 B1 | 2/2001 | Frederiksen | 455/566 |
| 6,198,948 B1 | 3/2001 | Sudo et al. | 455/566 |
| 6,201,524 B1 | 3/2001 | Aizawa | 345/123 |
| 6,215,474 B1 * | 4/2001 | Shah | 345/168 |
| 6,662,244 B1 * | 12/2003 | Takahashi | 710/14 |
| 6,708,046 B1 * | 3/2004 | Takagi | 455/575.3 |
| 2001/0054988 A1 * | 12/2001 | Cone et al. | 345/7 |

* cited by examiner

*Primary Examiner*—Matthew Anderson
*Assistant Examiner*—Shaima Q. Aminzay
(74) *Attorney, Agent, or Firm*—Winstead Sechrist & Minick (57) ABSTRACT

A personal communication device comprising a dual mode display for a user's viewing in both a direct-view mode, wherein sufficiently-sized characters are displayed in a manner visible to the user without further magnification, and in "projection-view" mode, wherein more content can be displayed over that of the direct-view mode.

11 Claims, 10 Drawing Sheets

PERSONAL COMMUNICATION DEVICE HAVING A BUILT IN PROJECTION DISPLAY

This present application claims the benefit of the filing date of U.S. Provisional Patent Application Ser. No. 60/251, 202 filed Dec. 4, 2000.

TECHNICAL FIELD

The present invention generally relates to communication devices, and more particularly, relates to personal communication devices including built-in projection displays.

BACKGROUND INFORMATION

A significant market is under development for compact communication devices combining cellular (or other wireless) telephones with a limited-function computer. An early example of this class of devices being called "personal communicators" is the IBM/Bell-South "SIMON." In its present form, the SIMON adds a relatively small computer (8086-class, moving to 80386-class), plus a backlit, touch-sensitive display to a cellular telephone. This combination of computer, wireless communication, and enabling software creates a powerful productivity tool, which allows a single device to provide wireless telephony functions, personal information management (e.g., electronic calendar and address/phone number listings), as well as two-way wireless transfer of digital data.

Some of the limitations of these devices have heretofore included the difficulty of viewing the data display while communicating over the phone, the weight and fragility of the relatively large LCD display, the relatively high power required for the back-lit monochrome display, and the even higher cost and power to provide a color display. Further limitations have also included size and human-factor design issues, the ability of the user to manipulate a device with minimal effort, and the preference of a user for easily viewing a display akin to that a user may be accustomed to in a typical office environment. Additionally, users may have difficulty adapting to viewing a display that is substantially smaller than the view they may be accustomed to from their fixed desktop display units.

Furthermore, the touch- and stylus-based user interfaces generally require two hands to operate and preclude the simultaneous use of the phone handset and the computer functions, except in a speaker-phone mode where the user would have to speak to the unit while holding it in front of him. While speech-based operation will be added to these devices in the future, a practical speech-based user interface still requires the user to see a display during use, since the user needs to see the set of allowable selections (the menu items), while for dictation mode, the user would like to see the progress of the speech-to-text translation.

As an alternative to SIMON-like designs that make it difficult to utilize the phone handset in the normal, private (non-speaker-phone) mode while also viewing the display, it has been suggested that the personal communicator should be fashioned like a pair of glasses or goggles, with a view-finder "projection" display and a speaker and microphone all built into the "frames" of the headset. While this interaction paradigm may eventually become common and widely accepted (probably by today's video-game generation), it is not as natural or convenient for the user who frequently needs to make a quick phone call or needs to just briefly check some e-mail. Similarly, such a design does not achieve the nimbleness or convenience often desired in a professional environment, be it mobile or fixed.

Another possible alternative is to make a SIMON-like device where the display ran be detached from the unit and held in the front of the user by the hand opposite the one holding the phone. An infrared or other wireless link between the phone and the display would allow data coming over the main handset to be relayed to the display. Although this design does allow simultaneous viewing/talking, it requires two hands for simple operation and makes pointing or selecting an item from the display a difficult (possibly three-handed) operation.

Therefore, a need exists for a personal communication device with both a direct-view display on the device and a projection display view orientation permitting the user to view the device's display as though the display were a "full screen" display.

SUMMARY OF THE INVENTION

The present invention is a device having a direct-view display on a personal communication device and a projection display view orientation permitting the user to view the device's display as though it were a "full screen" display. The present invention may be nimbly-sized to be flexible to accommodate unique user demands in an environment where the user is mobile or fixed, such that the user is required to exert minimal effort, without necessitating the use of two hands, to operate and communicate using the device.

One aspect of the present invention device is that the device comprises a single high resolution display, where such display can be used both as a high-resolution direct-view display on the phone and also as a "full-screen" projection display. When operating the present invention, a user may position the phone into a specific mode, such as the "projection display" orientation, whereupon the user's view of the display of the phone appears to be greater than that of the actual display size of the phone. For instance, the high-resolution display and the flip-out mirror, when positioned as such create the optical equivalent of a full-size notebook display at normal reading distance. This dual usage of a single high-resolution display is presented without limitation in the figures herein.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific display technologies, etc., to provide a thorough understanding of the present invention. However, it will be obvious to those skilled in the art that the present invention may be practiced without such specific details.

Refer now to the drawings wherein depicted elements are not necessarily shown to scale and wherein like or similar elements are designated by the same reference numeral through the several views.

This application incorporates by reference U.S. Pat. No. 5,970,418, which discloses a personal communication device including both audio and a display.

Figures 1, 1A, 1B, 1C:
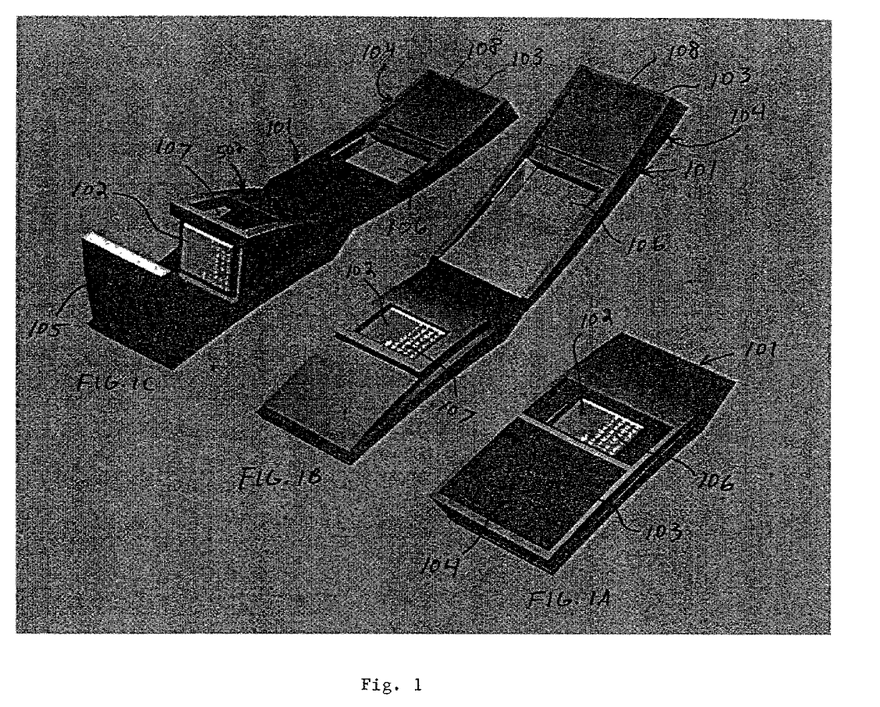
FIGS. 1A, 1B and 1C illustrate the present invention in three modes of operation, from left to right, wherein the present invention is fully-extended, is partly-extended, and is closed.

FIG. 1 illustrates a personal communications device 101 configured in one embodiment of the present invention where a cover 103 is in a closed position, in a manner similarly known in the art as the closed position of a flip phone. The display 102 is directly visible when the phone 101 is closed. Navigation in the display 102 by the user can be controlled using the "touch-pad" 104, which is located just below the display 102.

Other input means could be utilized instead of, or in addition to, touch-pad 104, such as some type of button to operate by a user to move a cursor on display 102. In this mode, device 101 can be utilized by a user as a personal digital assistant, calculator, address book, etc., or could even be utilized as a wireless telephone where a speaker-phone configuration is used to permit the user to converse with another party.

In FIG. 1B, the display 102 is also visible (while in "direct-view" mode) when the phone 101 is flipped open, i.e., the cover 103 has been opened with respect to the main body of the phone 101. In this mode, a user can use the device 101 as a phone where a speaker 108 is located on an inside portion of cover 103, and a microphone is located somewhere on the main body.

Figure 9:
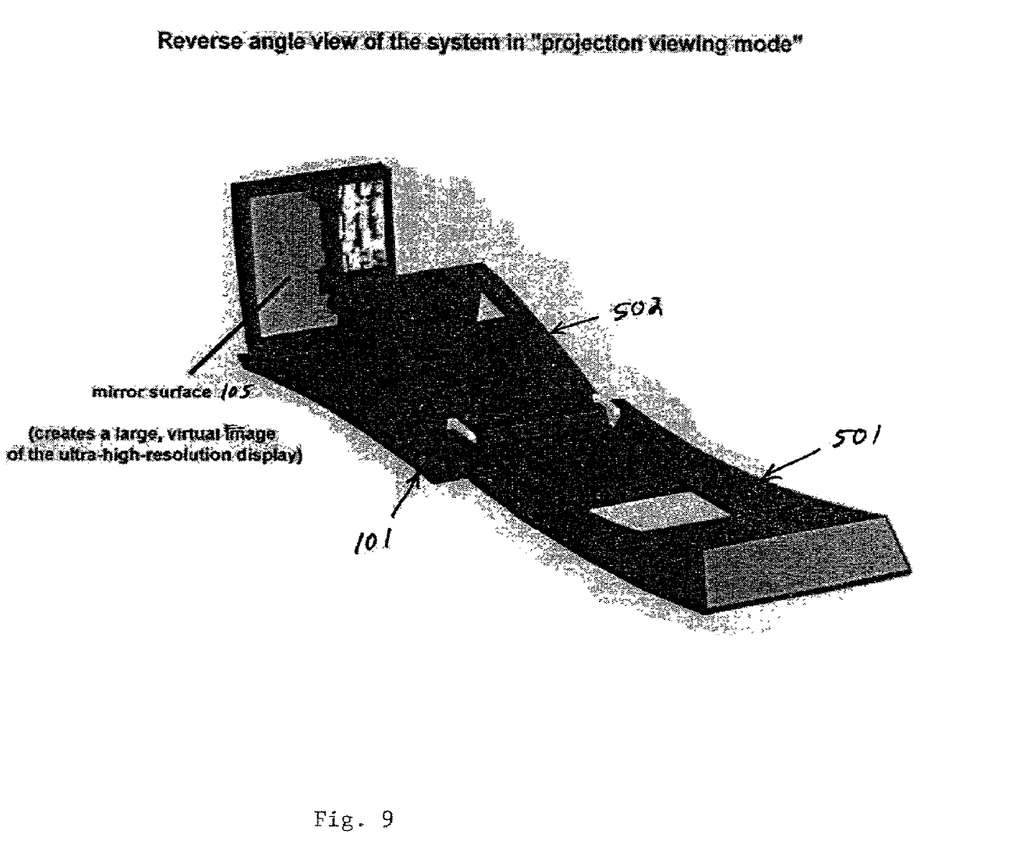
FIG. 9 illustrates the present invention in a reverse angle orientation wherein the device is in a "projection viewing" mode.

In FIG. 1C, the device 101 is configured to be in "projection mode", wherein a curved mirror 105 is activated and flips open (the mirrored side is facing the display 102) and the display 102 moves into a new orientation where it can be viewed in the reflection from the mirror 105 (see FIG. 9). In both of the open configurations (FIGS. 1B and 1C), the touch-pad 104 (which is now located on the "outside" surface of the phone 101 right behind the speaker 108 at the user's ear) can still be used to navigate a graphical user interface displayed on display 102. In FIG. 1C, the display 102 and the reflective surface (mirror) 105 are hineably attached to the main body of the device 101, and the cover 502 may also hinge upward for enabling the display 102 to flip up as illustrated. Operation of the device 101 in the mode illustrated in FIG. 1C is discussed in further detail below.

Figure 2:
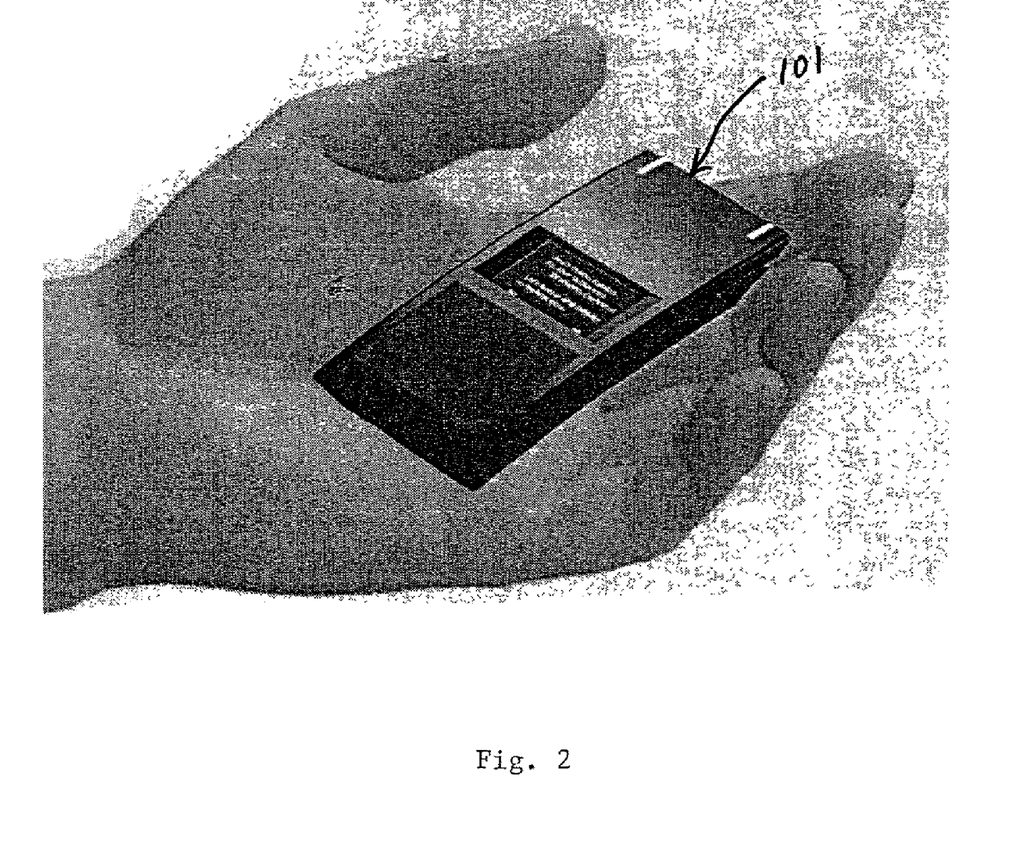
FIG. 2 illustrates the present invention, nimbly-sized, in a closed position resting in a user's hand.
Figure 3:
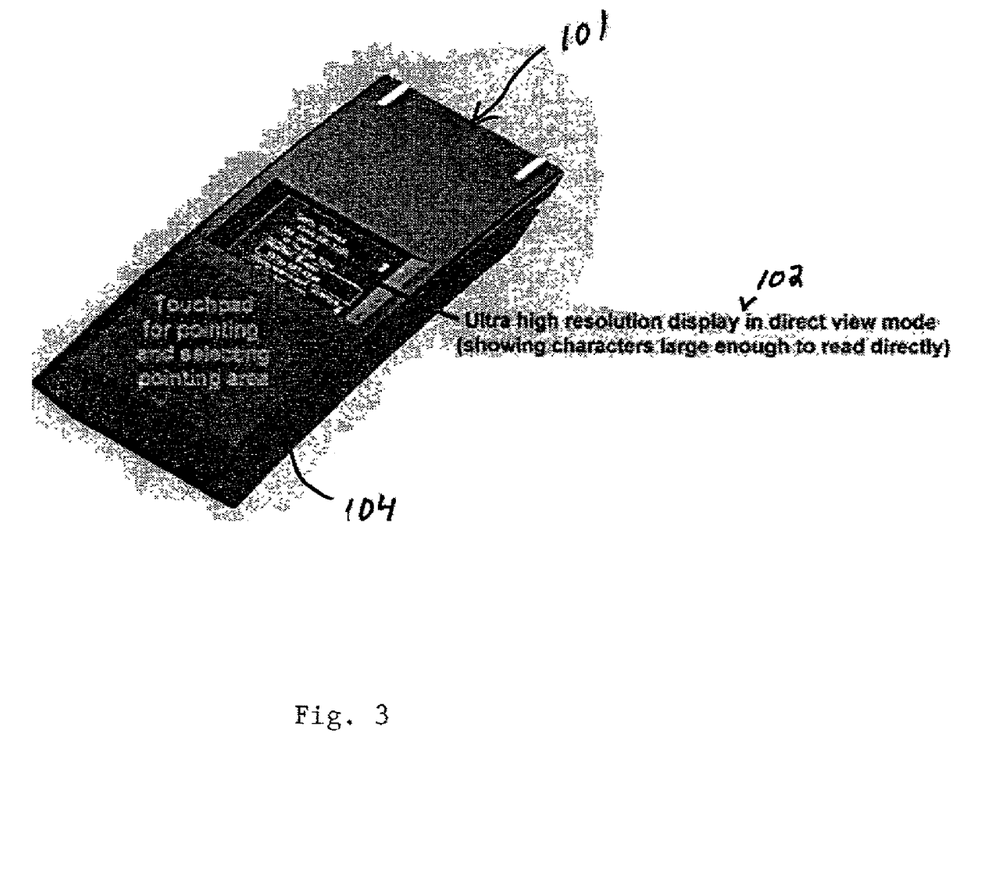
FIG. 3 illustrates the present invention in direct view mode with an exposed touch-pad.

As in FIGS. 2 and 3, the present invention device is a small handheld device 101 in a form which is generally stylized to be similar to that of a cellular "flip-phone." Additionally, the present invention may include a full cellular phone capability allowing access to the Wide-Area-Network or Internet. Similarly, the device 101, in another embodiment, is limited to a short-range wireless link (such as a Bluetooth link or device) which allows access only to devices in close proximity (such as a PDA or notebook computer). In either case, the device 101 includes a small but very high-resolution display 102 (for example, it might be approximately a 1-inch diagonal, VGA- or SVGA-resolution display) which is visible when the device 101 is in a closed orientation.

Figure 4:
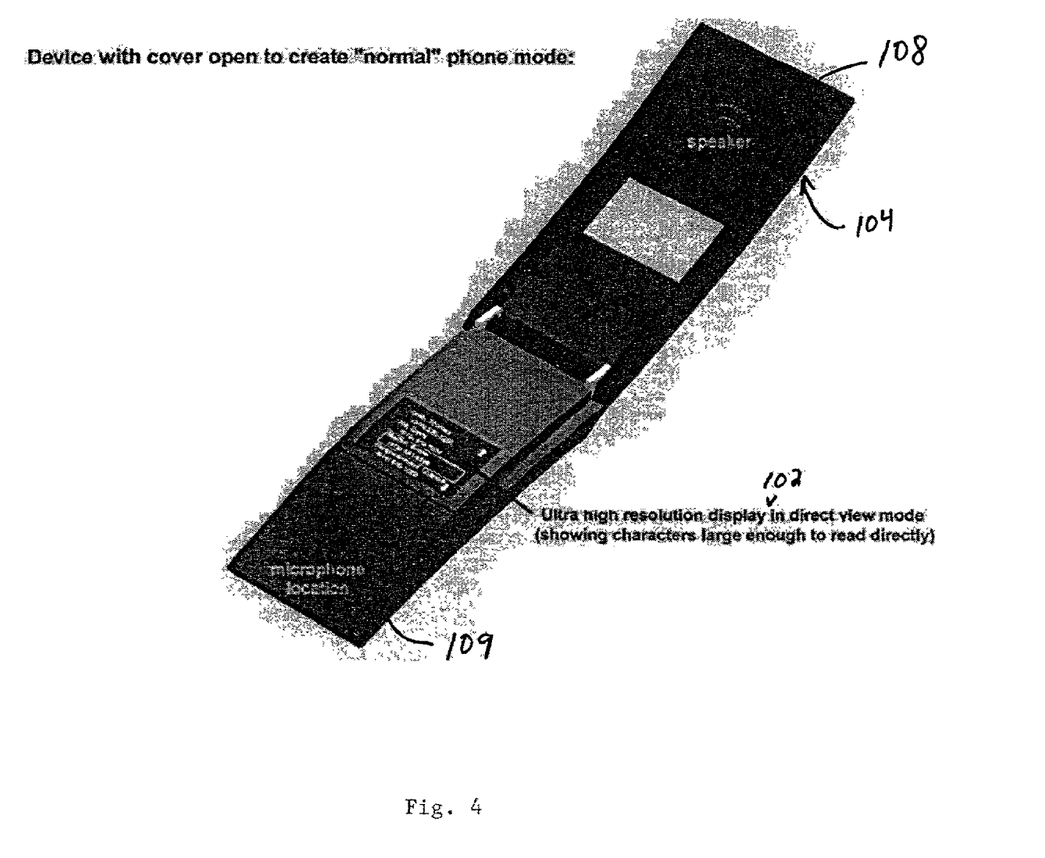
FIG. 4 illustrates the present invention in a normal phone mode operation with a flip cover open.

In FIG. 4, the "Open/Direct-View" mode, the device 101 is depicted to be held and operated like a normal phone handset, with a speaker 108 at one end and a microphone 109 at the other end. The display 102 depicts characters of sufficient size to be directly visible and legible to a user (without magnification), and the touch-pad 104 (which is on the surface behind the speaker 108) is still comfortably operable by a user with the index finger while, for example, the user looks at the display 102 and scrolls through a phone directory to select a number to dial.

Figure 5:
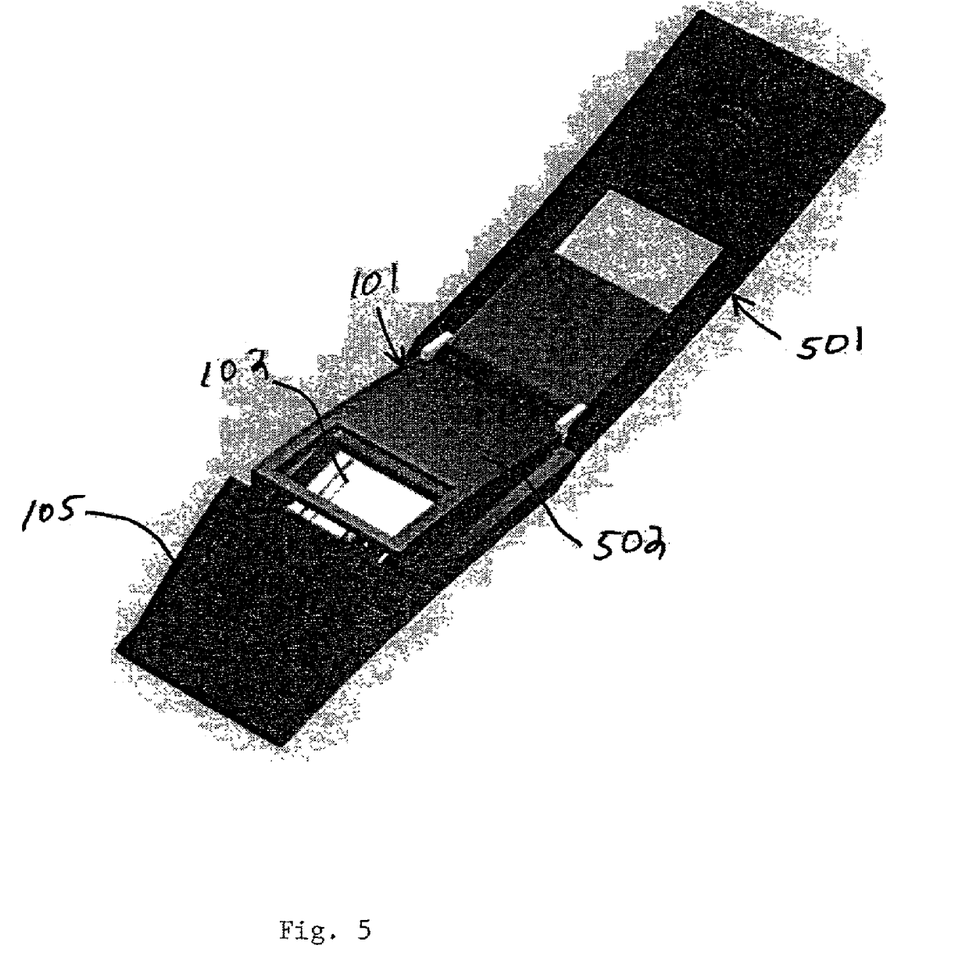
FIGS. 5 through 7 illustrate the present invention in various positions in which the device is positioned by a user from a normal mode to a projection viewing mode.
Figure 6:
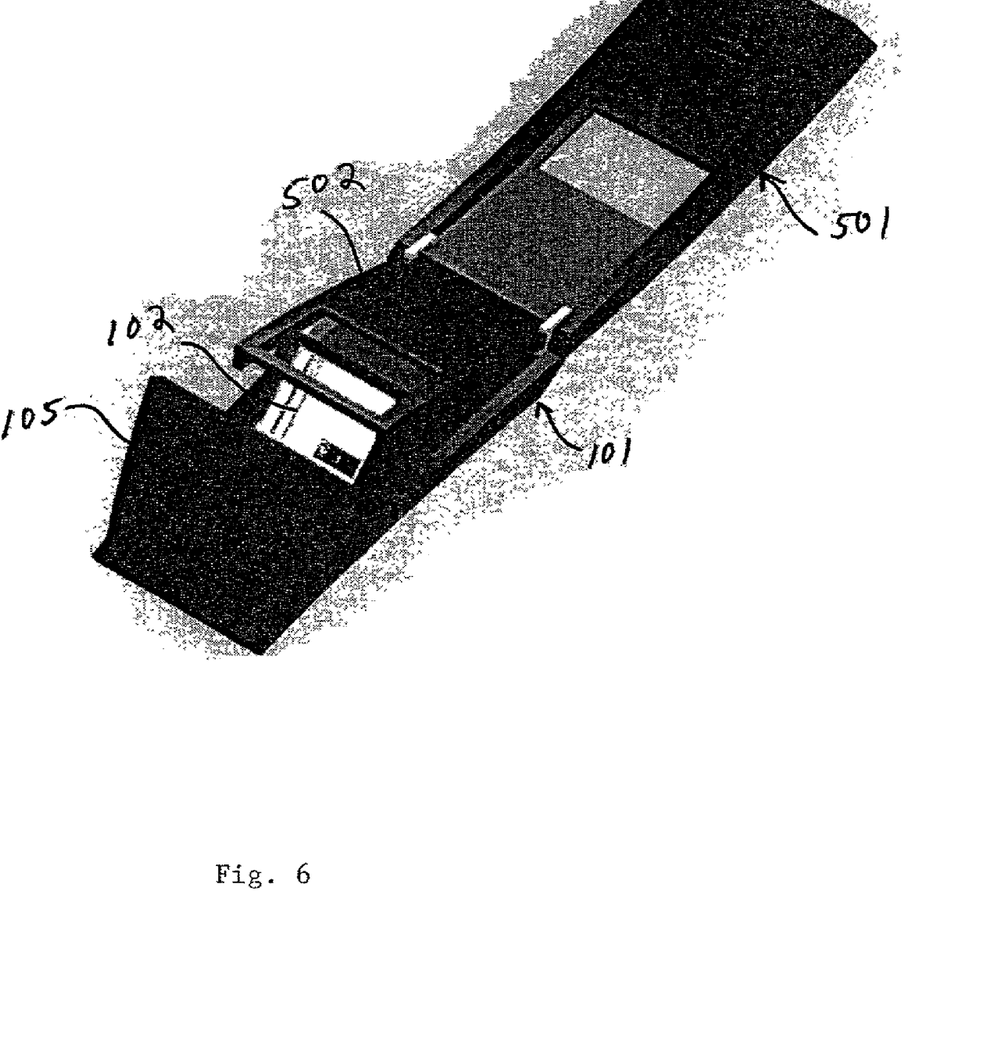
Figure 7:
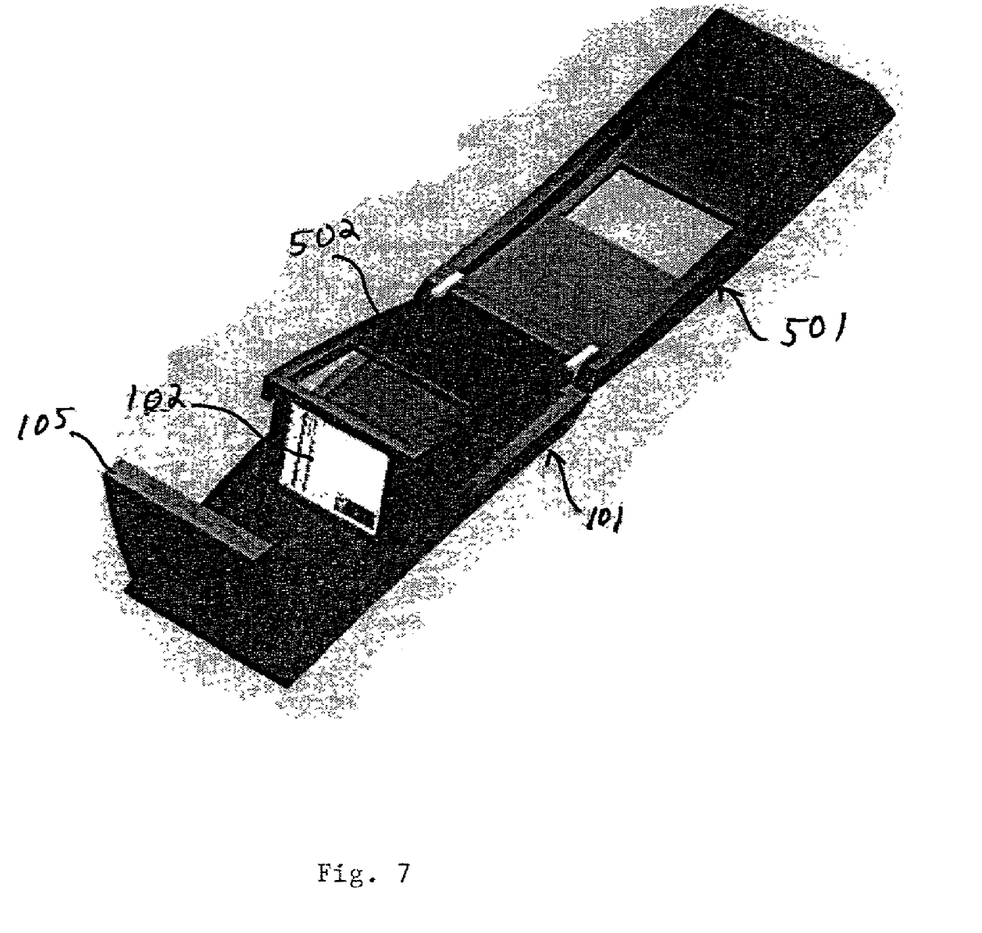

In an "Open/Projection-View" mode (see FIG. 1C), the display 102 is repositioned so that it can be viewed through reflective magnification optics 105. In this mode, the small display could show a significant portion or the entirety of the contents of a standard computer screen (or web page, etc.). When the display 102 is viewed through the reflective magnification optics 105, the user sees the optical equivalent of a much larger display which is positioned at some reasonable reading distance away from the user. The technology for switching to display 102 from the more direct high resolution display illustrated with respect to FIGS. 2–3 to the projection mode illustrated with respect to FIGS. 5–7 is well known in the art. Moreover, the mere act of opening the device 101 into the projection mode as shown in FIGS. 5–7 could activate a mechanical switch whereby the display device switches from a high resolution display of information directly to a user to the projection mode as noted above.

In FIGS. 5 through 7, the transition from the Open/Direct-View mode to Open/Projection-View mode is accomplished by a) having a viewing mirror 105 flip open, b) laying the display cover assembly 502 open to provide clearance, and c) having the display 102 itself rotate approximately 70–90 degrees, as shown in sequence in the Figures.

Figure 8:
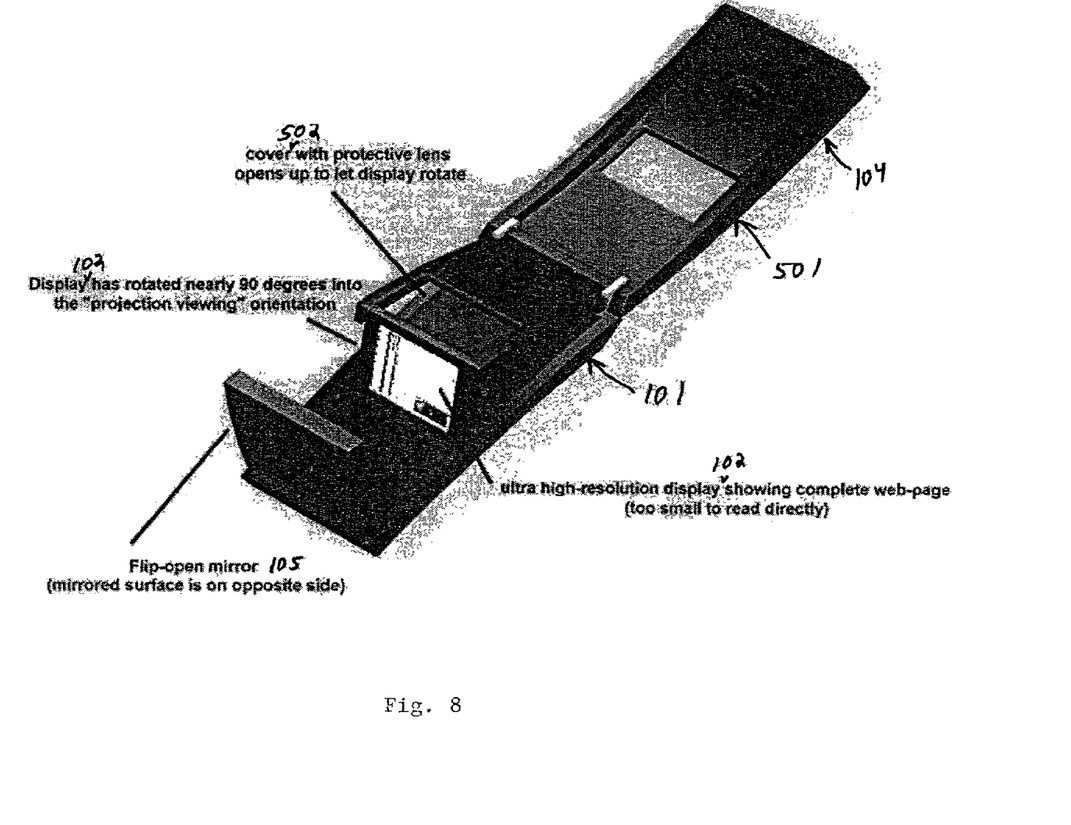
FIG. 8 illustrates the present invention with the display in a "projection viewing" orientation.
Figure 10:
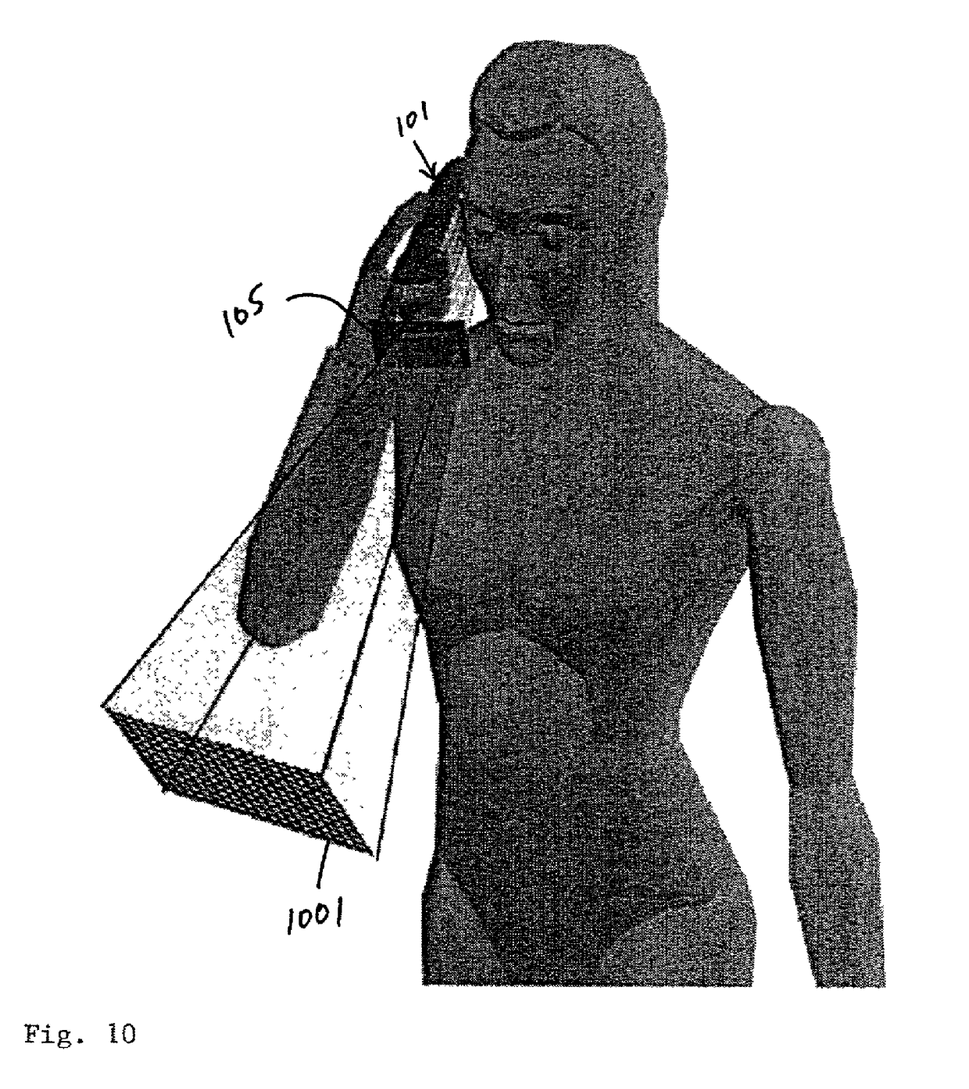
FIG. 10 illustrates a viewing using the present invention in a "projection viewing" mode and illustrates the perceived location of the viewed display.

In FIG. 8, when the device 101 is in this configuration, it may be easily operated by a user such that a user may hold the device 101 up to the user's ear like a normal phone. In this configuration, referring to FIG. 10, the user can comfortably look into the mirror 105 and see the reflected and highly magnified image 1001 of the display 102, enabling viewing of "full-screen" content in a compact device. The touch-pad 104, which is on the rear surface of the cover 502 behind the speaker 108, can comfortably be reached and operated using the index finger of the hand which is holding the phone 101.

From each of the Figures, the present invention allows the phone device 101 to be nimbly-sized and extremely thin when in a closed mode, such that the display 102 remains in an easily viewable location when closed. Additionally, in the projection viewing orientation, a second orientation configuration is positioned wherein the display 102 rotates approximately 90 degrees for use in projection mode, as illustrated in FIG. 9.

Software for flipping the displayed image 90 degrees is well known in the art. As depicted in the various figures, the present invention is shown to be operative in three different modes: a) Closed/Direct-View, b) Open/Direct-View, and c) Open/Projection-View, although other modes are envisioned.

Key attributes of the present invention include but are not limited to following:

1) the present invention incorporates a single display for both direct-viewing mode and projection-viewing mode;

2) the present invention provides convenient direct-viewing access in two different configurations—with the "lid" closed or open;

3) the present invention provides for a much thinner package through the use of a pivoting or rotating display which lays flat in direct-viewing modes but which rotates significantly for projection-viewing mode; and 4) the present invention provides a single touch-pad which can be comfortably accessed in all 3 operating modes (although different coordinate "transformations" are required to compensate for the change in orientation of the touch-pad relative to the display image), and regardless of whether the phone is being held by the right hand or the left hand.

Although the present invention and its advantages have been described in detail, it should be understood that various changes, substitutions and alterations can be made herein without departing from the spirit and scope of the invention as defined by the appended claims.

What is claimed is:

1. A communications device having first and second modes of operation, where in the first mode of operation a display built into the device displays information for direct viewing by a user, and where in the second mode of operation the display built into the device projects information onto a reflective surface for viewing by the user, wherein the first mode of operation the display displays the information at such a size that the information is legible when viewed directly by the user, and wherein the second mode of operation the display projects the information onto the reflective surface at a size larger than when the information is displayed for direct viewing by the user.

2. The communications device as recited in claim 1, wherein the information projected onto the reflective surface appears as if it were being displayed by a display device larger than the display.

3. The communications device as recited in claim 1, wherein the first mode of operation the display is viewable by the user through a window in a cover while in a closed position, and wherein the second mode of operation the cover is in an open position.

4. The communications device as recited in claim 3, wherein the information is also viewable directly by the user with the cover in the open position.

5. The communications device as recited in claim 1, further comprising an input device that permits input by the user when in either the first or second modes of operation.

6. The communications device as recited in claim 1, wherein the device is a telephone that permits the user to conduct a conversation while also viewing the display.

7. A personal communications device comprising:
a main body having a built in display;
a cover hingably attached to the main body, wherein the display is viewable by a user through an opening in the cover when the cover is in a closed position with respect to the main body;
a reflective surface attached to the main body for reflecting images projected by the display when the cover is in an open position with respect to the main body; and
wireless telephone circuitry for permitting the user to conduct a telephone conversation, including a speaker in the cover and a microphone, wherein the user can view the images projected onto the reflective surface while holding the device to a side of the user's face to conduct the telephone conversation.

8. The device as recited in claim 7, wherein the reflective surface and the display are both hingably attached to the main body and are hinged to open positions for projection of the images from the display to the reflective surface.

9. The device as recited in claim 8, wherein the images are rotated 90 degrees when projected onto the reflective surface from an orientation when displayed by the display when it is in a closed position.

10. The device as recited in claim 7, further comprising:
an input device for moving and selecting items displayed on the display by the user.

11. A personal communication device comprising
a dual mode display for a user's viewing in both a direct view mode, wherein sufficiently sized characters are displayed in a manner visible to the user without further magnification, and in "projection view" mode, wherein more content can be displayed over that of the direct view mode; and
a tri mode display for a user's viewing in both an open direct view mode, wherein sufficiently sized characters are displayed in a manner visible to the user without further magnification when a lid is in an open position, a closed direct view mode, wherein sufficiently sized characters are displayed in a manner visible to the user without further magnification when the lid is in a closed position, and in "projection view" mode, wherein more content can be displayed over that of direct view mode.

* * * * *